United States Patent
Hamann et al.

(10) Patent No.: US 12,305,566 B2
(45) Date of Patent: May 20, 2025

(54) TURBINE FOR AN EXHAUST GAS TURBOCHARGER, IN PARTICULAR OF A MOTOR VEHICLE, AND INTERNAL COMBUSTION ENGINE

(71) Applicant: Mercedes-Benz Group AG, Stuttgart (DE)

(72) Inventors: Matthias Hamann, Dornstetten (DE); Nils Brinkert, Ludwigsburg (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/724,051

(22) PCT Filed: Jan. 13, 2023

(86) PCT No.: PCT/EP2023/050712
§ 371 (c)(1),
(2) Date: Jun. 25, 2024

(87) PCT Pub. No.: WO2023/135241
PCT Pub. Date: Jul. 20, 2023

(65) Prior Publication Data
US 2025/0092818 A1 Mar. 20, 2025

(30) Foreign Application Priority Data
Jan. 17, 2022 (DE) .................. 10 2022 000 150.0

(51) Int. Cl.
*F02B 37/18* (2006.01)
*F01D 17/10* (2006.01)

(52) U.S. Cl.
CPC .......... *F02B 37/183* (2013.01); *F01D 17/105* (2013.01); *F05D 2220/40* (2013.01); *F05D 2240/12* (2013.01); *F05D 2260/606* (2013.01)

(58) Field of Classification Search
CPC ........ F02B 37/00; F02B 37/18; F02B 37/183; F02B 37/22; F01D 17/105; F05D 2220/40;
(Continued)

(56) References Cited

U.S. PATENT DOCUMENTS 3,484,078 A * 12/1969 Haenky .................. F16K 5/204
251/210
7,347,048 B2 * 3/2008 Albat ....................... F02B 37/24
60/624
(Continued)

FOREIGN PATENT DOCUMENTS

DE    10 2006 058 102 A1    6/2008
DE    10 2011 115 206 A1    3/2013
(Continued)

OTHER PUBLICATIONS

International Search Report (PCT/ISA/210) issued in PCT Application No. PCT/EP2023/050712 dated Mar. 6, 2023 (2 pages).
(Continued)

*Primary Examiner* — Dapinder Singh
(74) *Attorney, Agent, or Firm* — Crowell & Moring LLP

(57) ABSTRACT

A turbine for an exhaust gas turbocharger has a turbine housing which has at least two flow paths which are fluidically separated from one another at least in some regions and through which exhaust gas from an internal combustion engine can flow. A turbine wheel is accommodated in the turbine housing and can be driven by the exhaust gas. The turbine has a bypass channel via which the turbine wheel can be bypassed by at least part of the exhaust gas and has a through-flow opening via which the flow paths can be fluidically connected to one another. A valve element is adjustable between a closed position closing the bypass channel and the through-flow opening and an open position at least partially opening the bypass channel and the
(Continued)

through-flow opening. The valve element has a flow channel which penetrates the valve element and through which the exhaust gas can flow.

8 Claims, 3 Drawing Sheets

(58) Field of Classification Search
CPC ........... F05D 2240/12; F05D 2260/606; F01N 13/00; F01N 13/001; F01N 2410/00; F01N 2470/00; Y02A 50/20; Y02T 10/12
See application file for complete search history.

(56) References Cited

U.S. PATENT DOCUMENTS

| | | | |
|---|---|---|---|
| 7,934,379 B2* | 5/2011 | Kuspert | .................... F02D 9/06 |
| | | | 60/602 |
| 10,767,554 B2 | 9/2020 | Mehne et al. | |
| 10,823,048 B2* | 11/2020 | Hottenbach | ........... F02B 37/025 |
| 10,961,901 B2 | 3/2021 | Sparrer | |
| 11,578,645 B2* | 2/2023 | Daniels | .................... F02B 37/18 |
| 2011/0123315 A1* | 5/2011 | Robinson | .............. F02B 37/013 |
| | | | 415/1 |
| 2014/0144134 A1* | 5/2014 | McEwan | ................ F02B 37/013 |
| | | | 60/602 |
| 2018/0023460 A1* | 1/2018 | Mawer | .................. F16K 11/076 |
| | | | 251/304 |

FOREIGN PATENT DOCUMENTS

| | | |
|---|---|---|
| DE | 10 2013 002 894 B4 | 4/2014 |
| DE | 11 2015 005 540 B4 | 8/2017 |
| DE | 10 2016 208 160 A1 | 11/2017 |
| DE | 10 2016 208 163 A1 | 11/2017 |
| EP | 3 401 528 A1 | 11/2018 |

OTHER PUBLICATIONS

German-language German Office Action issued in German Application No. 10 2022 000 150.0 dated Aug. 2, 2022 (8 pages).

* cited by examiner

TURBINE FOR AN EXHAUST GAS TURBOCHARGER, IN PARTICULAR OF A MOTOR VEHICLE, AND INTERNAL COMBUSTION ENGINE

BACKGROUND AND SUMMARY OF THE INVENTION

The invention relates to a turbine for an exhaust gas turbocharger, in particular of a motor vehicle. Furthermore, the invention relates to an internal combustion engine for a motor vehicle.

Such a turbine for an exhaust gas turbocharger, in particular of a motor vehicle, is already known, for example, from DE 10 2013 002 894 B4. The turbine has a turbine housing which has at least two flow paths which are fluidically separated from one another at least in some regions and through which exhaust gas from the internal combustion engine can flow. Furthermore, DE 10 2016 208 163 A1 discloses a turbine for an exhaust gas turbocharger. An exhaust gas turbocharger is also known from DE 11 2015 005 540 B4. Furthermore, DE 10 2016 208 160 A1 discloses a turbine for an exhaust gas turbocharger. DE 10 2006 058 102 A1 discloses an internal combustion engine with an exhaust gas turbocharger. DE 10 2011 115 206 A1 discloses an exhaust gas turbocharger for an internal combustion engine. In addition, a turbocharger system is known from EP 3 401 528 A1.

The object of the present invention is to create a turbine for an exhaust gas turbocharger and also an internal combustion engine having at least one such turbine, so that a particularly advantageous fluid connection can be realized.

A first aspect of the invention relates to a turbine for an exhaust gas turbocharger, in particular of a motor vehicle. This means that the motor vehicle, preferably formed as a car, in particular a passenger car, which is also simply referred to as a vehicle, has the exhaust gas turbocharger with the turbine in its completely manufactured state. In particular, in its completely manufactured state, the motor vehicle has an internal combustion engine, for example formed as a reciprocating piston engine and also referred to as an engine or internal combustion engine, by means of which the motor vehicle can be driven. During a fueled operation of the internal combustion engine, combustion processes take place in the internal combustion engine. During the particular combustion process, a particular fuel-air mixture, also simply referred to as a mixture, is burnt, resulting in exhaust gas from the internal combustion engine. As will be explained in greater detail below, the turbine can be driven by means of the exhaust gas. The mixture comprises at least air and, in particular, a liquid fuel. In particular, the fuel is petrol, i.e., a fuel for spark ignition engines. The internal combustion engine is therefore preferably designed as a spark ignition engine. The turbine has a turbine housing which has at least or exactly two flow paths which are fluidically separated from each other at least in some regions and which are fluidically separated from one another by a partition wall of the turbine housing. The exhaust gas can flow through each flow path. The turbine also has a turbine wheel which is accommodated, in particular rotatably, in the turbine housing. The turbine wheel can be driven by the exhaust gas and can therefore be rotated about an axis of rotation relative to the turbine housing, for example. In particular, each flow path can be designed as a corresponding spiral channel, which extends, for example, in the circumferential direction of the turbine wheel over its circumference at least substantially in a spiral shape. In particular, the turbine wheel is accommodated in a receiving space of the turbine housing, also known as a receiving region. For example, each flow path flows into the corresponding region so that the exhaust gas flowing through a particular flow path can be guided from the flow path in question into the receiving region and thus to the turbine wheel. This means that the exhaust gas flowing through a particular flow path can flow out of the flow path in question and into the receiving region and subsequently can flow onto the turbine wheel, thereby driving the turbine wheel.

The turbine, in particular the turbine housing, has at least or exactly one bypass channel, via which the turbine wheel can be bypassed by at least part of the exhaust gas. In particular, the bypass channel extends at least partially within the turbine housing and/or the bypass channel is at least partially bounded directly by the turbine housing. The feature that at least part of the exhaust gas can bypass the turbine wheel via the bypass channel means that the exhaust gas flowing through the bypass channel bypasses the turbine wheel, i.e., does not drive the turbine wheel. The bypass duct is also referred to as a waste gate, waste gate duct, bypass or bypass duct.

The turbine housing, also has at least or exactly one through-flow opening which is formed in the partition wall and via which the flow paths can be fluidically connected to one another. In particular, the through-flow opening can be limited, especially directly, by the turbine housing. In particular, the through-flow opening is a through-flow opening that is different from the bypass channel and separate from the bypass channel or provided in addition to the bypass channel, via which the flow paths can be fluidically connected to one another. The bypass channel is usually used to adjust, in particular to control, a boost pressure that can be provided by the exhaust gas turbocharger.

The turbine also has at least one valve element which is adjustable, i.e., movable, between a closed position and at least one open position, in particular relative to the turbine housing. In the closed position, the bypass channel and the through-flow opening are closed, i.e., fluidically blocked, by means of the valve element, also known as the valve body. Thus, preferably in the closed position, no exhaust gas can flow through the bypass channel, and preferably in the closed position, no exhaust gas can flow through the through-flow opening, so that, for example, in the closed position, a fluidic connection between the flow paths caused by the through-flow opening is prevented, i.e., closed. In particular, it is envisaged that in the closed position, the flow paths are fluidically separated from each other, especially completely. In the open position, the valve element releases both the bypass channel and the through-flow opening at least in some regions, in particular simultaneously, so that in the open position the exhaust gas can flow into the bypass channel and flow through the bypass channel. In the open position, the exhaust gas can also flow through the through-flow opening and thus, for example, can flow from one of the flow paths via the through-flow opening into the other flow path, i.e., can flow over.

If the flow paths are fluidically separated from each other by the through-flow opening being fluidically closed, i.e., fluidically blocked, in the closed position by means of the valve element, a so-called surge charging can be carried out to charge the internal combustion engine, i.e., to supply the internal combustion engine with compressed air. By opening the through-flow opening, i.e., by connecting the flow paths with each other via the through-flow opening, a so-called accumulation charge can be realized to charge the internal combustion engine.

Preferably, the valve element is formed in one piece, i.e., a one-piece body. In other words, it is preferable that the valve element is not composed of several components that are formed separately from one another and connected to one another, but rather the valve element is preferably an integral, i.e., one-piece body and thus a body manufactured integrally or in one piece, which is formed as a monoblock. Very preferably, it is intended that the valve element simultaneously releases both the bypass channel and the through-flow opening, at least in some regions, when it is moved from the closed position to the open position.

In order to be able to fluidically connect the flow paths of the turbine in a particularly advantageous manner and thus realize a particularly advantageous flow path connection, it is provided according to the invention that the valve element has at least or exactly one flow channel which penetrates the valve element, in particular completely, and thus extends in particular within the valve element and through which the exhaust gas can flow, which is thus completely circumscribed by the valve element (valve body), for example along its circumferential direction, in particular over its entire extent running in the direction of flow of the exhaust gas flowing through the flow channel.

In the closed position, the through-flow opening is completely closed by the valve element.

In the closed position, a fluidic connection between the flow paths created by the flow channel is prevented, which means that the flow paths are also not fluidically connected to each other via the flow channel in the closed position. This means that a strict separation of the flow paths can be realized in the closed position, so that it is possible to switch between a fluidic connection of the flow paths and a fluidic separation of the flow paths as required.

In the open position, the valve element exposes a first partial region of the flow opening, and in the open position, the valve element still projects into a second partial region of the flow opening directly adjoining the first partial region, whereby the valve element is arranged in the second partial region, wherein the flow channel is located in a part of the second partial region, whereby the flow channel is a fluidic connection between the flow paths provided in addition to the released, first partial region and the exhaust gas can flow through the released, first partial region and the flow channel and thus the part of the second partial region.

The flow channel can be used, for example, to fluidically connect the flow paths, for example in the open position, in addition to only partially releasing the through-flow opening, i.e., to fluidically connect them to one another, for example, if the valve element itself releases the first partial region of the through-flow opening in the open position and still projects into the second partial region of the through-flow opening, in particular directly adjacent to the first partial region, and is therefore arranged in the second partial region. Then, for example, the flow channel can be located in the part of the second partial region or the exhaust gas can flow through the released first partial region and the flow channel and thus the part of the second partial region so that, for example, a high volume and/or mass flow of the exhaust gas can flow over from one of the flow paths into the other flow path in each case.

For example, the flow channel is formed by at least or exactly one bore, which makes the flow channel particularly cost-effective. For example, the turbine is at least or exactly a two-flow-path segment turbine, whereby a particularly advantageous or efficient operation can be realized. The invention is based on the flow path connection already known from the prior art, which is particularly variable in that the through-flow opening can be completely fluidically blocked and thus closed by moving the valve element into the closed position, wherein the through-flow opening can be at least partially opened by moving the valve element into the open position. In particular, it is conceivable that the valve element can be moved into the closed position and into the aforementioned at least one open position as well as into at least one or more further open positions, i.e., can be moved, wherein the through-flow opening is at least partially opened in the respective further open position. In particular, a respective volume and/or mass flow of the exhaust gas can flow through the through-flow opening in the respective open position, with the volume and/or mass flows differing from one another in the open positions. This makes it possible to realize a particularly needs-based and therefore variable connection of the flow paths, also known as a flow path connection. The valve element has a dual function. On the one hand, the valve element is used as a flow path connection valve to either close or open the through-flow opening. On the other hand, the valve element is used as a waste gate valve or bypass valve to either open or close the bypass channel. The valve element simultaneously defines a first effective area of a turbine wheel bypass and a second effective area of the flow path connection, particularly in the respective open positions. The exhaust gas can flow through the first effective area and flow into the bypass channel via this, and the exhaust gas can flow through the second effective area and thereby flow from one flow path into the other flow path. Turbine wheel bypassing means that at least part of the exhaust gas bypasses the turbine wheel. In other words, for example, especially in the open position, the first effective area and the second effective area are each at least partially bounded directly by the valve element, in particular by an outer circumferential surface of the valve element, wherein the exhaust gas flowing through the first effective area bypasses the turbine wheel and wherein the exhaust gas flowing through the second effective area flows from one of the flow paths into the other flow path. On the one hand, this allows surge charging to be implemented, for example in the event of load jumps and high demands on the transient behaviour of the internal combustion engine. On the other hand, the turbine can also be operated at rated power with comparatively good efficiencies. One feature of the valve element can be its area ratio, i.e., a ratio of the first effective area to the second effective area or vice versa. A contour of the valve element, in particular on the outer circumference, can define the aforementioned areas and thus the area ratio and a resulting mass flow ratio of the exhaust gas depending on the respective open position and thus in particular on an opening angle of the valve element. The mass flow ratio is to be understood as a ratio of a first mass flow of the exhaust gas to a second mass flow of the exhaust gas, wherein, for example, the first mass flow flows through the first area or bypasses the turbine wheel and the second mass flow flows through the through-flow opening or flows over from one of the flow paths into the other flow path.

Conventionally, however, it is not possible to geometrically generate any desired flow path connection characteristic from the motor's point of view. Compared to conventional solutions, the invention now enables an improved and, in particular, more demand-oriented adjustment or setting of the mass flow ratio, in particular in the respective open position. In particular, the invention extends the possibility of adjusting the mass flow ratio, especially in the respective open position, wherein it is no longer just geometric gap areas that are varied, but effective flow areas. For this purpose, the flow channel according to the invention, also known as a flow channel, is formed in the valve element. The flow channel makes it possible, for example, even with a small opening angle of the valve element, i.e., when the valve element is only very slightly open and in doing so releases both the bypass channel and the through-flow opening, in particular simultaneously, but releases the through-flow opening only very slightly, for example in such a way that the aforementioned first partial region is released while the valve element itself is still arranged in the wide partial region, for example in such a way that the exhaust gas can now flow through both the released first partial region and the flow channel. As a result, a strong or extensive flow path connection can be created despite the small opening angle or despite the only slight opening of the valve element. In other words, a large volume and/or mass flow can be realized despite the small opening angle or even with a small opening angle of the valve element, and can flow from one of the flow paths into the other flow path. As a result, the kinematics of the valve element can result in a comparatively low flow path connection mass flow even at small opening angles, which increases significantly at larger opening angles. The respective flow path connection mass flow is to be understood as a respective mass flow of the exhaust gas flowing from one of the flow paths into the other flow path.

By a design of the flow channel, a main connecting flow of the exhaust gas flowing through the first partial region, for example, can be used to activate an additional connecting mass flow of the exhaust gas flowing through the flow channel. In this way, the invention makes it possible to achieve a desirable or required flow path connection characteristic, wherein, for example, an advantageous, in particular an advantageously small, size of the valve element can be realized or maintained at the same time. As a result, a performance gain can be achieved without generating additional forces in a kinematic system intended, for example, for moving or adjusting the valve body. The kinematics provided for adjusting or moving the valve element, in particular between the open position and the closed position, comprises, for example, an electric actuator, which is also known as an e-actuator. The electric actuator is an electrically operated actuator by means of which, for example, the valve element can be moved from the closed position to the open position and/or from the open position to the closed position using electrical energy.

In order to be able to guide the exhaust gas through the flow channel in a particularly demand-orientated and advantageous manner, it is provided that the flow channel has at least one arcuate length region, in particular in at least or exactly one imaginary plane.

Alternatively or additionally, it is provided that the flow channel has at least two length regions, in particular running obliquely or perpendicularly to one another in at least one or exactly one imaginary plane, whereby the exhaust gas can be guided through the flow channel and thus through the valve element in a particularly advantageous manner.

Alternatively or additionally, it is provided that the flow channel runs in an S-shaped or Z-shaped course at least in a partial region, in particular in at least or exactly one imaginary plane. This allows the respective points at which the exhaust gas flows into the flow channel and out of the flow channel to be arranged in a particularly advantageous manner, so that a particularly advantageous routing of the exhaust gas can be achieved.

It has thus been shown to be particularly advantageous if, in the open position of the valve element, the flow paths are fluidically connected to one another via the flow channel. In other words, it is preferably provided that the flow channel is designed in such a way or for such a purpose that, in the open position, the flow paths are fluidically connected to one another via the flow channel. In other words, in the open position, the exhaust gas can flow from one of the flow paths into the flow channel and subsequently can flow through the flow channel and flow into the other flow path via the flow channel, so that the flow channel is designed in particular to guide the exhaust gas from one of the flow paths into the respective other flow path in the open position. This allows a particularly advantageous operation to be realized, as the flow paths can be fluidically connected to each other even at small opening angles, i.e., when the valve element is only slightly open.

A further embodiment is distinguished by the fact that the flow channel is fluidically blocked in the closed position by a wall region of the turbine housing. This makes it particularly easy to ensure that no exhaust gas can flow from one of the flow paths into the other flow path in the firing position, so that the flow paths can be fluidically separated from each other or connected to each other as required.

In a particularly advantageous embodiment of the invention, it is provided that in the closed position the through-flow opening is completely closed by means of the valve element. This allows particularly precise and defined switching between a flow path connection, consequently between a fluidic connection between the flow paths, and a flow path separation, consequently a state in which the flow paths are, in particular completely, fluidically separated from one another. This enables particularly favourable operation.

A second aspect of the invention relates to an internal combustion engine for a motor vehicle, simply referred to as a combustion engine or engine and designed, for example, as a reciprocating piston engine. The internal combustion engine has at least one exhaust gas turbocharger, which has a turbine according to the first aspect of the invention. Advantages and advantageous embodiments of the first aspect of the invention are to be regarded as advantages and advantageous embodiments of the second aspect of the invention, and vice versa.

Further advantages, features and details of the invention will become evident from the following description of preferred exemplary embodiments and on the basis of the drawings. The features and combinations of features mentioned above in the description as well as the features and combinations of features mentioned below in the description of the figures and/or shown alone in the figures can be used not only in the combination indicated in each case, but also in other combinations or on their own, without departing from the scope of the invention.

DETAILED DESCRIPTION OF THE DRAWINGS

In the figures, like or functionally like elements are provided with the same reference signs.

Figure 1:
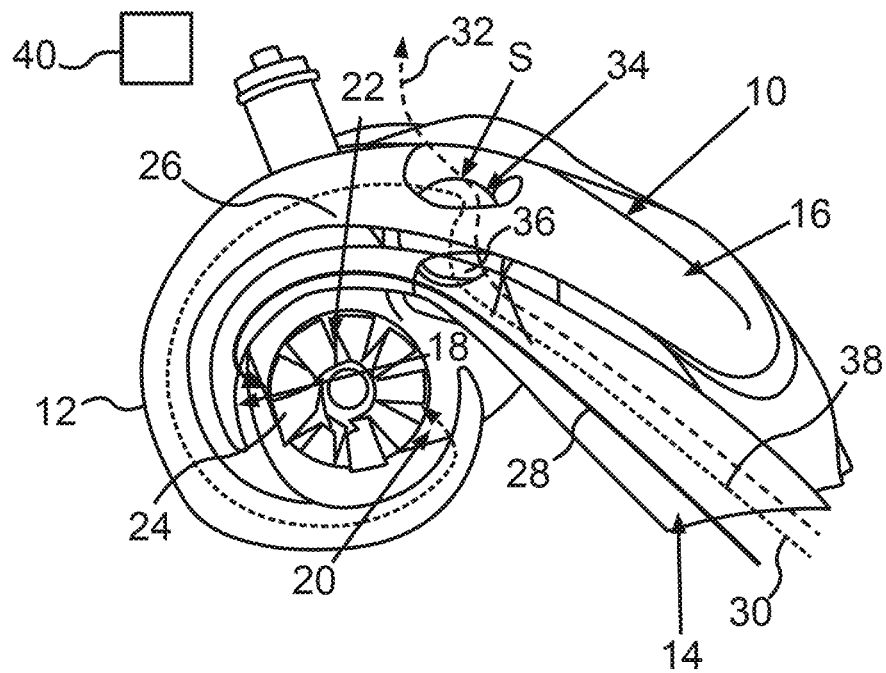
FIG. 1 is a detailed schematic perspective view of a turbine for an exhaust gas turbocharger of an internal combustion engine.
Figure 2:
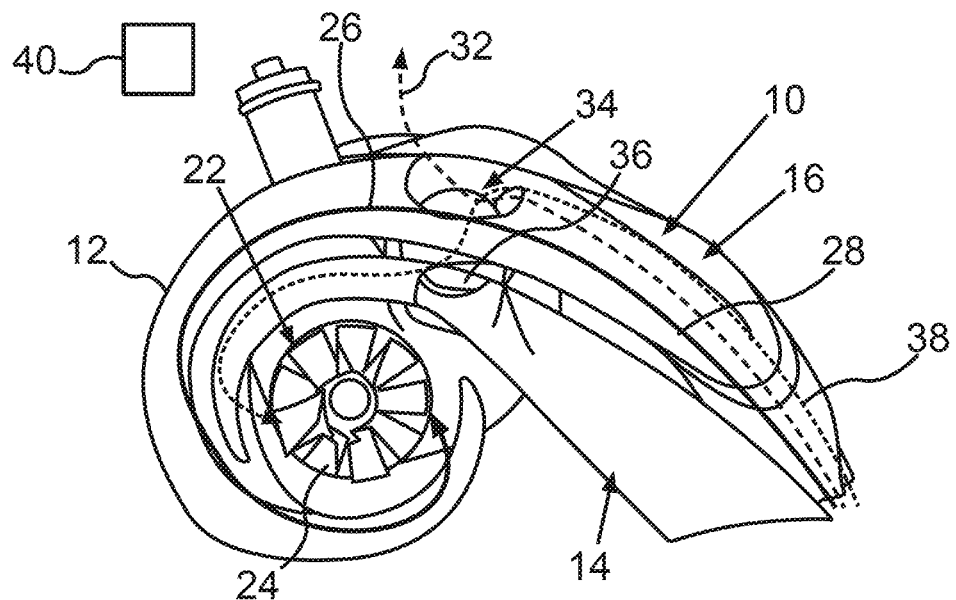
FIG. 2 is another detailed schematic perspective view of the turbine.
Figure 3:
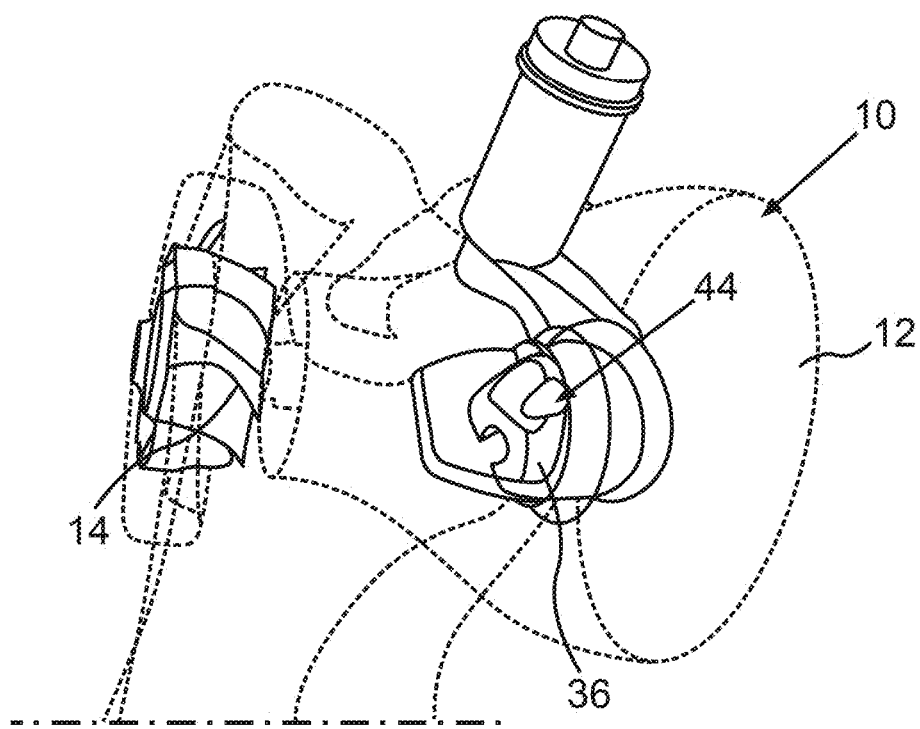
FIG. 3 is another detailed schematic perspective view of the turbine.

FIGS. 1 and 2 each show a detailed schematic perspective view of a turbine 10 for an exhaust gas turbocharger of an internal combustion engine. The internal combustion engine is designed, for example, as a reciprocating piston engine and has several combustion chambers. For example, the internal combustion engine has at least or exactly four combustion chambers. The respective combustion chamber is partially bounded by a respective cylinder. Each cylinder accommodates a corresponding piston so that the latter can move in translation, wherein the particular combustion chamber is partially bounded by the corresponding cylinder and partially by the corresponding piston accommodated in the cylinder in question so that it can move in translation. During a fired operation of the internal combustion engine, combustion processes are carried out in the combustion chambers. During the particular combustion process, a fuel-air mixture, also known simply as a mixture, is burnt. The mixture in question comprises at least air and, in particular, a liquid fuel. Preferably, the internal combustion engine is a petrol engine. The particular combustion process results in exhaust gas from the internal combustion engine. The exhaust gas can flow out of the particular combustion chamber, can flow into an exhaust system of the internal combustion engine and can flow through the exhaust system. The turbine 10 of the exhaust gas turbocharger is arranged in the exhaust system, which is also referred to as the exhaust tract.

The exhaust gas turbocharger has a compressor, which is arranged in an intake tract of the internal combustion engine, also known as the inlet tract. The aforementioned air can flow here through the intake tract and is guided to and into the combustion chambers by means of the intake tract. The air flowing through the intake tract can be compressed by means of the compressor.

FIGS. 1 and 2 show that the turbine 10 has a turbine housing 12 with exactly two flow paths 14 and 16, wherein the flow paths 14 and 16 are fluidically separated from each other and the exhaust gas can flow through them. In the exemplary embodiment shown in FIGS. 1 and 2, the turbine 10 is designed as a two-flow-path segment turbine. This means that the respective flow path 14, 16 has a respective outflow opening 18, 20 and opens out into a receiving region 22 of the turbine housing 12 via the respective outflow opening 18, 20, wherein the outflow openings 18 and 20 are arranged consecutively, i.e., one behind the other, in the circumferential direction of the turbine 10. The turbine 10 also has a turbine wheel 24, which is accommodated in the receiving region 22 and thus in the turbine housing 12 and is rotatable about an axis of rotation relative to the turbine housing 12. The aforementioned circumferential direction of the turbine 10 runs around the aforementioned axis of rotation, so that the outflow openings 18 and 20 are arranged consecutively in the circumferential direction of the turbine wheel 24 as viewed over its circumference. Each flow path 14, 16 is designed as a spiral channel. The flow paths 14 and 16 are fluidically separated from each other by a partition wall 26 of the turbine housing 12. In FIG. 1, a first flow of the exhaust gas, in this case through the flow path 14, is illustrated by an arrow 28. A second flow of the exhaust gas through the turbine housing 12 is illustrated by an arrow 30, wherein the second flow will be explained in greater detail below.

The turbine 10, in particular the turbine housing 12, has a bypass channel, illustrated by an arrow 32, via which the turbine wheel 24 can be bypassed by at least part of the exhaust gas. It can be seen from the arrow 32 that the exhaust gas flowing through the bypass channel bypasses the turbine wheel 24 and thus does not drive the turbine wheel 24. The exhaust gas, which flows through the particular flow path 14, 16 and is guided into the receiving region 22 by means of the particular flow path 14, 16, flows onto the turbine wheel 24 and thereby drives the turbine wheel 24, whereby the turbine wheel 24 is rotated about its axis of rotation relative to the turbine housing 12. The compressor has a compressor wheel arranged in the intake tract and can be driven by the turbine wheel 24, in particular via a shaft. By driving the compressor wheel, the air flowing through the intake tract can be compressed by means of the compressor wheel.

The turbine 10, in particular the turbine housing 12, has precisely one through-flow opening 34, which is formed in the partition wall 26. As will be explained in greater detail below, the flow paths 14 and 16 can be fluidically connected to each other by means of the through-flow opening 34, in particular at precisely one point S.

The turbine 10 has a valve element 36, which can be partially recognized in FIG. 1 and is also referred to as the valve body. The valve element 36 is adjustable relative to the turbine housing 12 between a closed position closing the bypass channel and the through-flow opening 34, in particular completely, and at least one open position opening the bypass channel and the through-flow opening 34 at least partially, which is illustrated in FIGS. 1 and 2. The arrows 28 and 32 and a further arrow 38 show that the exhaust gas initially flows through the flow path 14, for example. If the valve element 36 is in its open position, for example, a first portion of the exhaust gas initially flowing through the flow path 14 flows out of the flow path 14, through the through-flow opening 34 and via the through-flow opening 34 into the flow path 16, whereupon the first portion flows through the flow path 16 and is guided by means of the flow path 16 into the receiving region 22 and thus to the turbine wheel 24. A second part of the exhaust gas initially flowing through the flow path 14 remains in the flow path 14 and is guided by means of the flow path 14 to and into the receiving region 22 and thus to the turbine wheel 24. The first part of the exhaust gas is illustrated by the arrow 38, wherein the arrow 28 illustrates the second part. The arrow 32 illustrates that, for example, a third part of the exhaust gas initially flowing through the flow path 14 flows from the flow path 14, in particular via the through-flow opening 34, into the bypass channel as a result of the valve element 36 being in the open position and subsequently flows through the bypass channel and thus bypasses the turbine wheel 24. In the closed position, the valve element 36 closes the through-flow opening 34, in particular completely, and thus completely fluidically blocks it, and it is preferable that in the closed position the bypass channel is completely closed, i.e., completely fluidically blocked, by the valve element 36. In the open position, the valve element 36 releases both the through-flow opening 34 and the bypass channel at least in some regions.

The turbine 10 can have an actuator 40, shown particularly schematically in FIG. 1 or also referred to as an actuator, by means of which, for example, the valve element 36 can be moved from the closed position to the open position and/or from the open position to the closed position relative to the turbine housing 12. For example, the actuator 40 is an electric actuator, consequently an electrically operated actuator, so that the actuator 40 is also referred to as an e-actuator. Very preferably, it is provided that the valve element 36 simultaneously at least partially opens both the bypass channel and the through-flow opening 34 when it is moved from the closed position to the open position.

Figure 4:
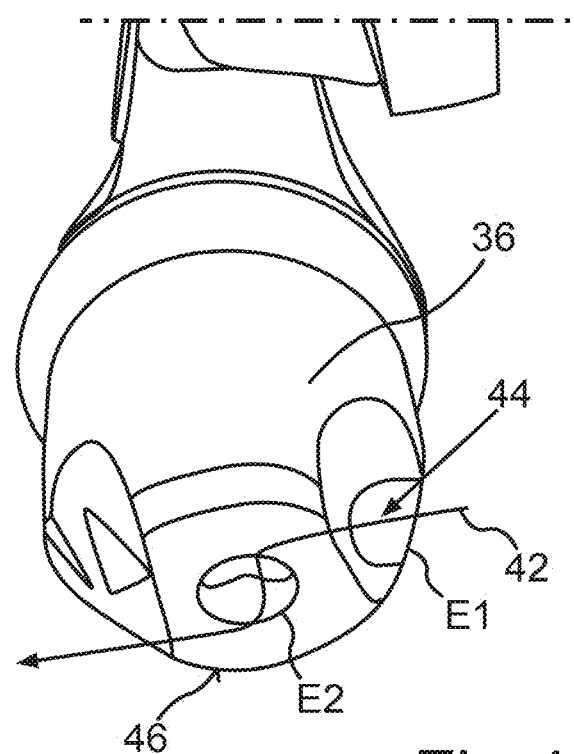
FIG. 4 is a schematic perspective view of a first embodiment of a valve element of the turbine.
Figure 5:
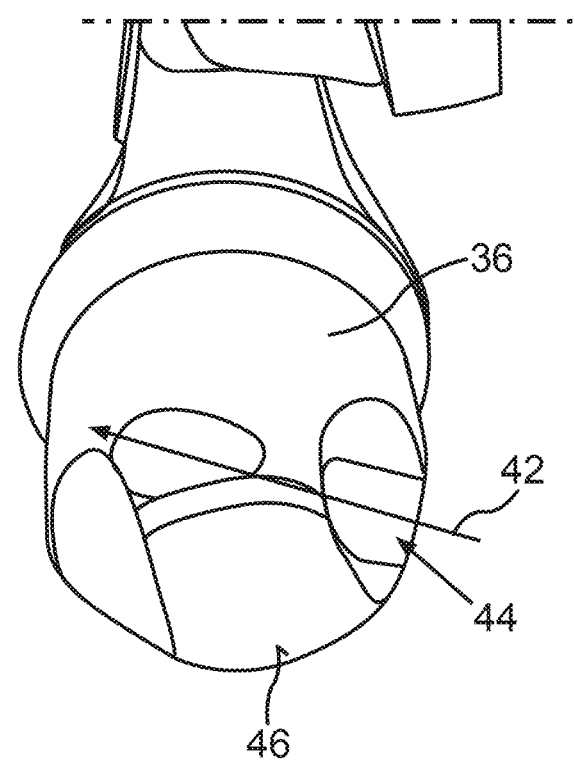
FIG. 5 is a schematic perspective view of a second embodiment of the valve element.

In order to be able to realize a particularly advantageous fluidic connection, also referred to as a flow path connection, of the flow paths 14 and 16 at point S, the valve element 36, as can be seen particularly well in conjunction with FIGS. 4 and 5, has at least, or as is provided in FIGS. 4 and 5, precisely one flow channel 44 which penetrates the valve element 36, in particular completely, and thus extends within the valve element 36 and, as is illustrated in FIG. 4 by an arrow 42, can be passed through by the exhaust gas, which flow channel, in particular over its entire extent extending within the valve element 36, is completely bounded by the valve element 36, in particular completely, in the circumferential direction of the flow channel 44. The arrow 42 shown in FIG. 4 illustrates a flow of the exhaust gas through the flow channel 44. The turbine 10 is designed here in such a way that the flow paths 14 and 16 are fluidically connected to each other via the flow channel 44 when the valve element 36 is in the open position.

For example, the valve element 36 can be swivelled between the open position and the closed position, in particular about a swivel axis. The valve element 36 can thus be swivelled, for example, into different angular positions, also known as swivel positions. One, in particular exactly one, of the angular positions is the closed position. The other or all other swivel positions are also referred to as opening angles and are open positions in which the valve element 36 opens both the bypass channel and the through-flow opening 34, in particular simultaneously. In particular with small opening angles, for example, the valve element 36 releases a first partial region of the through-flow opening 34, and the valve element 36, however, still projects into a second partial region of the through-flow opening 34, which in particular directly adjoins the first partial region, so that the valve element 36 is still arranged in the second partial region with small opening angles. If the valve element 36 were free of a flow channel through which the exhaust gas could flow, such as the flow channel 44, the exhaust gas could only flow through the unobstructed first partial region of the through-flow opening 34 and could not also use the second partial region to flow from one of the flow paths 14 and 16 into the respective other flow path 16 and 14. However, the valve element 36 now has the flow channel 44, which extends, for example, from a first end E1 to a second end E2 of the flow channel 44. For example, the end E1 is arranged in the second partial region of the through-flow opening 34, particularly at small opening angles, so that the exhaust gas can now flow into the flow channel 44 at one of the ends E1 and E2 and can flow from one end E1, E2 to the other end E2, E1 and thus can flow through the flow channel 44 and subsequently can be guided from one of the flow paths 14 and 16 to the respective other flow path 16 and 14 by means of the flow channel 44. Thus, the exhaust gas can not only flow from one of the flow paths 14 and 16 to the respective other flow path 16 or 14 via the released, first partial region, but the exhaust gas can also flow through the flow channel 44 and thus can flow from one of the flow paths 14 and 16 to the respective other flow path 16 or 14 via the flow channel 44. The flow channel 44 is thus, so to speak, a fluidic connection between the flow paths 14 and 16 provided in addition to the released first partial region, so that, for example, large exhaust gas mass flows can also flow between the flow paths 14 and 16, in particular while the valve element 36 releases the bypass channel only very slightly.

FIG. 4 shows a first embodiment of the valve element 36. In the first embodiment, the end E2 is arranged on an axial end face 46 of the valve element 36.

Typically, and in particular when the valve element 36 is free of a flow channel through which the exhaust gas can flow, such as the flow channel 44, a contour of the valve element 36, which is also referred to as the valve body, in particular only on the outer circumference, defines a ratio, also referred to as the mass flow ratio, of a first mass flow of the exhaust gas flowing through the bypass channel in the open position and a second mass flow of the exhaust gas flowing through the through-flow opening 34 in the open position. The mass flow ratio is dependent on the respective opening angle of the valve element 36. However, it is conventionally not possible to generate any desired flow path connection characteristic from an engine perspective geometrically, i.e., through the contour of the valve element 36. Due to the size of the exhaust gas turbocharger, a specification of the actuator 40 and a catalytic converter flow, many parameters of the turbine 10 and, in particular, of the valve element 36 are fixed, especially with regard to the opening and closing of the bypass channel as well as the flow path connection. Subsequent changes to the opening kinematics, in particular for adjusting the valve element 36 or an outer circumferential shape and thus the outer circumferential contour of the valve element 36, directly influence the required scope of protection. For this reason, the valve element 36 plays a special role in defining the flow path connection and, in particular, its characteristics.

In an engine process simulation, engine targets can lead to a target curve of the flow path connection characteristic. This target curve, which is also simply referred to as a curve, often shows a wide adjustment range of the valve element 36, in which above all a connection area of the through-flow opening 34, also referred to as the flow path connection area, is increased, while a second area, also referred to as the wastegate area, via which the exhaust gas can flow into the bypass channel, only increases significantly with large opening angles of the valve element 36. If the possibilities are exhausted, for example by adjusting the valve element 36, and if an overall increase in the size of the valve element 36 is ruled out, further increases in the flow path connection area can no longer be achieved according to the current prior art. One aim can therefore be to bring the flow path connection characteristic closer to the target curve in a different way, for example by adding an additional feature. It should be ruled out that the additional feature has an influence on the flow path connection characteristic when the valve element 36 is closed, i.e., in the closed position. Simulations have shown that, despite an elaborate and complex geometry and thus contour of the valve element 36, particularly on the outer circumference, a fairly strong or extensive flow path connection can be realized without the flow channel 44, but it may not be possible to use the entire partial region of the through-flow opening 34 released by the valve element 36 in the respective open position for the fluidic connection of the flow paths 14 and 16. This can be attributed to the flow routing towards the valve element 36, which is not ideal, particularly in the case of a small turbocharger size.

By providing the valve element 36 with at least or exactly one flow channel 44, it was possible to optimize the flow path connection at least almost selectively. By providing the valve element 36 with the flow channel 44, the exhaust gas or its flow is provided with a further usable cross-section for the flow path connection, since the exhaust gas can now flow from one flow path 14 and 16 to the respective other flow path 16 and 14 not only via the released first partial region of the through-flow opening 34, but also via the flow channel 44 released in the open position.

In the first embodiment shown in FIG. 4, for example, the end E2 is an outlet of the channel, the outlet of which, for example, in the first embodiment is at the level of a separating web. As a result, a fluidic connection between flow paths 14 and 16 can be excluded in the closed position of the valve element 36, in particular by the fact that in the closed position the end E2 and thus the flow channel 44 is closed, i.e., fluidically blocked, in particular by the fact that, for example, the axial end face 46 and thus the end E2 in the closed position rest, in particular directly, against a corresponding wall region of the turbine housing 12. For example, the outlet (end E2), in particular the entire outlet, is thus closed by the wall region. It was found that, in addition, a locally high velocity at the separator or, as a result, a low static pressure can be utilized in order to guide the largest possible mass flow from the active flow path 14, 16 to the passive flow path 16, 14. The active flow path and the passive flow path are to be understood in particular as follows: At least a first one of the combustion chambers, in particular at least or exactly two first ones of the combustion chambers, are assigned to the flow path 14, in particular fluidically connected to the flow path 14, wherein at least a second one of the combustion chambers, in particular at least or exactly two second ones of the combustion chambers, are assigned to the flow path 16, in particular fluidically connected to the flow path 16. The exhaust gas from the first combustion chambers initially flows only into the flow path 14, in particular in relation to the flow paths 14 and 16, but not also into the flow path 16. The exhaust gas from the second combustion chambers initially flows into the flow path 16, in particular in relation to the flow paths 14 and 16, but not also into the flow path 14. In FIG. 1, the flow path 14 is the active flow path and the flow path 16 is the passive flow path, since, for example, only the first combustion chambers provide exhaust gas in relation to the first combustion chambers and the second combustion chambers. The exhaust gas from the first combustion chambers thus first flows into the flow path 14 and then, when the valve element 36 is in the open position, at least partially from the flow path 14 into the flow path 16. In FIG. 2, the flow path 16 is the active flow path, while the flow path 14 is the passive flow path, because, according to FIG. 2, only the second combustion chambers provide exhaust gas in relation to the first combustion chambers and the second combustion chambers, but not the first combustion chambers, so that the exhaust gas from the second combustion chambers first flows into the flow path 16 and then, when the valve element 36 is in the open position, at least partially flows out of the flow path 16 at point S and flows into the flow path 14. As in FIG. 1, the arrow 28 in FIG. 2 illustrates the exhaust gas, which first flows into the active flow path and remains in the active flow path and is guided by means of the active flow path to and into the receiving region 22 and thus to the turbine wheel 24. As in FIG. 1, the arrow 38 in FIG. 2 illustrates the exhaust gas, which initially flows into the active flow path, but does not remain in the active flow path, but instead flows through the at least partially released through-flow opening 34 at point S and thus overflows from the active flow path into the passive flow path. Furthermore, in FIG. 2, as in FIG. 1, the arrow 32 illustrates the exhaust gas flowing through the bypass channel.

Since the exhaust gas, in particular from the active flow path, now has access not only to the first partial region released in the respective open position, but also to the flow channel 44 in order to flow over from the active flow path into the passive flow path, a large mass flow of the exhaust gas can be realized even at small opening angles, and flows over from the active flow path into the passive flow path. Compared to the valve element 36 without a flow channel 44, a significant increase in flow path connection sizes, i.e., mass flows of exhaust gas flowing over from the active flow path into the passive flow path, was observed. In particular, by providing the flow channel 44, the turbine output can be increased with the same position of the valve element 36.

For example, the valve element 36 itself is solid and is provided in the present case with the flow channel 44. For example, the flow channel 44 is formed by at least one bore or by exactly one bore or by at least or exactly two bores. The flow channel 44 is an internal flow channel of the valve element 36 in order to be able to realize a particularly advantageous flow path connection. In the closed position, the flow channel 44 does not generate a fluidic connection between the flow paths 14 and 16. In the open position, however, the flow channel 44 generates a fluidic connection between the flow paths 14 and 16, which is provided in addition to the releasing, first sub-region, and thus an additional mass flow, also referred to as a flow path connection mass flow, of the exhaust gas flowing over from the active flow path into the passive flow path, wherein this additional flow path connection mass flow takes place in addition to a mass flow of the exhaust gas flowing through the releasing, first sub-region. The additional flow channel 44 can be formed by a single or by several bores that meet and are thus fluidically connected to one another. Of course, it is conceivable that the valve element 36 has several flow channels that are fluidically separated from one another in the valve element 36, such as the flow channel 44. The flow channel 44 can be designed to be flow-optimized in particular with regard to its radius or its radii and/or with regard to its rounding or roundings.

An inlet of the flow channel 44 provided, for example, at the end E1 or formed by the end E1, via the inlet of which the exhaust gas from the active flow can flow into the flow channel 44, is located directly in the exhaust gas flowing over or in its flow when the flow is active and thus pressurized and, for example, when the valve element 36 is significantly open and, for example, at opening angles which are greater than 30 percent of the maximum opening angle, and thus enables the exhaust gas to flow directly into the flow channel 44. The outlet of the flow channel 44 provided, for example, at the end E2 and formed by the end E2 is located, for example, at such a point on the valve element 36, wherein the point is blocked when the valve element 36 is closed, i.e., in the closed position.

In the first embodiment shown in FIG. 4, the flow channel 44 terminates at its end E2 directly on a partition wall surface of the flow path connection.

FIG. 5 shows a second embodiment in which the end E2 is arranged on a rear side of the valve element 36, the rear side of which, in the closed position, bears directly against a wall, also referred to as a wall region, which is formed, for example, by a housing in which the valve element 36 is arranged. The housing is, for example, the turbine housing 12 or a further housing that is separate from the turbine housing 12 and connected to the turbine housing 12.

The invention claimed is:
1. A turbine (10) for an exhaust gas turbocharger, comprising:
a turbine housing (12) which has at least two flow paths (14, 16) through which exhaust gas from an internal combustion engine is flowable and which are fluidically separated from one another by a partition wall (26) of the turbine housing (12);

a turbine wheel (24) disposed in the turbine housing (12) and drivable by the exhaust gas;

a bypass channel (32) via which the turbine wheel (24) is bypassable by at least a part of the exhaust gas;

a through-flow opening (34) which is formed in the partition wall (26) and via which the at least two flow paths (14, 16) are fluidically connected to one another; and a valve element (36) which is adjustable between a closed position closing the bypass channel (32) and the through-flow opening (34) and an open position releasing the bypass channel (32) and the through-flow opening (34) at least in a region, wherein the valve element (36) has a flow channel (44) penetrating the valve element (36) and through which the exhaust gas is flowable;

wherein in the closed position the through-flow opening (34) is completely closed by the valve element (36);

wherein in the closed position, a fluidic connection between the at least two flow paths (14, 16) created by the flow channel (44) is prevented such that that the at least two flow paths (14, 16) are not fluidically connected to each other via the flow channel (44) in the closed position;

wherein in the open position, the valve element (36) releases a first partial region of the through-flow opening (34) and projects into a second partial region of the through-flow opening (34) directly adjoining the first partial region and thus is disposed in the second partial region, wherein the flow channel (44) is disposed in a part of the second partial region, whereby the flow channel (44) is a fluidic connection between the at least two flow paths (14, 16) provided in addition to the released first partial region and the exhaust gas is flowable through the released first partial region and the flow channel (44) and thus the part of the second partial region.

2. The turbine (10) according to claim 1, wherein the flow channel (44) has at least one arcuate length region.

3. The turbine (10) according to claim 1, wherein the flow channel (44) has at least two length regions running obliquely or perpendicularly to one another.

4. The turbine (10) according to claim 1, wherein the flow channel (44) is S-shaped or Z-shaped at least in one partial region.

5. The turbine (10) according to claim 1, wherein the at least two flow paths (14, 16) are fluidically connected to one another via the flow channel (44) in the open position of the valve element (36).

6. The turbine (10) according to claim 1, wherein the flow channel (44) is fluidically blocked in the closed position by a wall region of the turbine housing (12).

7. The turbine (10) according to claim 1, wherein in the closed position the through-flow opening (34) is completely closed by the valve element (36).

8. An internal combustion engine for a motor vehicle, comprising:

an exhaust gas turbocharger which has the turbine (10) according to claim 1.

* * * * *